(12) United States Patent
Adams et al.

(10) Patent No.: US 6,662,952 B2
(45) Date of Patent: Dec. 16, 2003

(54) SHALE SHAKERS AND SCREENS FOR THEM

(75) Inventors: Thomas C. Adams, Hockley, TX (US); Guy L. McClung, III, Spring, TX (US)

(73) Assignee: Varco I/P, Inc., Houston, TX (US)

(*) Notice: Subject to any disclaimer, the term of this patent is extended or adjusted under 35 U.S.C. 154(b) by 0 days.

(21) Appl. No.: 10/053,350

(22) Filed: Jan. 16, 2002

(65) Prior Publication Data

US 2003/0132141 A1 Jul. 17, 2003

(51) Int. Cl.[7] .................................................. B07B 1/00

(52) U.S. Cl. ..................... 209/319; 209/399; 209/403; 209/405

(58) Field of Search .................. 209/319, 399, 209/403, 405, 315, 326, 397, 401, 409, 412

(56) References Cited

U.S. PATENT DOCUMENTS

| | | | |
|---|---|---|---|
| 583,981 A | 6/1897 | Cunningham et al. | |
| 599,468 A | 2/1898 | Cross | |
| D29,933 S | 1/1899 | Hodge | |
| 1,082,612 A | 12/1913 | Smith et al. | |
| 1,438,783 A | 12/1922 | Pessell | |
| 1,561,632 A | 11/1925 | Woodward | |
| 2,089,548 A | 8/1937 | Frantz et al. | |
| RE20,533 E | * 10/1937 | Dustan | 209/405 |
| 2,190,262 A | 2/1940 | Geist | |
| 2,274,700 A | 3/1942 | Jenks | |
| 2,511,239 A | * 6/1950 | Behnke et al. | 209/403 |
| 3,390,771 A | 7/1968 | Wehner | |
| 3,666,095 A | * 5/1972 | Krynock et al. | 209/254 |
| 3,716,138 A | 2/1973 | Lumsden | |
| 3,900,628 A | 8/1975 | Stewart | |
| 4,062,769 A | 12/1977 | Simonson | |
| 4,140,630 A | * 2/1979 | Scarlett et al. | 209/313 |
| 4,237,000 A | 12/1980 | Read et al. | |
| 4,491,517 A | 1/1985 | Janovac | |
| 4,575,421 A | 3/1986 | Derrick et al. | |
| 4,691,744 A | 9/1987 | Haver et al. | |
| 4,696,751 A | 9/1987 | Eifling | |
| 4,819,809 A | 4/1989 | Derrick | |
| 4,909,929 A | * 3/1990 | Tabor | 209/400 |
| 5,006,228 A | * 4/1991 | Anderson et al. | 209/365.3 |

(List continued on next page.)

FOREIGN PATENT DOCUMENTS

| | | |
|---|---|---|
| DE | 27 50 365 | 11/1977 |
| DE | 3301493 A1 | 6/1983 |
| GB | 1322014 | 5/1971 |
| GB | 2113121 A | 1/1982 |
| GB | 2252127 A | 1/1991 |
| WO | WO 01/76719 A2 | 4/2000 |

OTHER PUBLICATIONS

LM–3 Full –Flo Shale Shaker, Sweco Oilfield Services, 1991.
Mud Equipment Manual: Handbook 3: Shale Shakers, Gulf Publishing Co., 1976.
Int'l Search Report in PCT/GB 03/00208 & Accompanying PCT Form ISA/220.

*Primary Examiner*—Donald P. Walsh
*Assistant Examiner*—Joseph C Rodriguez
(74) *Attorney, Agent, or Firm*—Guy McClung

(57) ABSTRACT

A screen support for supporting screening material of a screen assembly for use on a shale shaker for separating components of material introduced thereto, the screen support having a body, a plurality of spaced apart holes through the body, each of said holes for receiving part of a fastener used for releasably connecting the screen assembly to a shale shaker; the screen support in certain aspects being a frame, a perforated plate, a strip support or a unibody structure; a screen assembly with such a support; such a screen assembly, in certain aspects, with a plastic grid or layer with corresponding fastener holes; a shale shaker with any such screen assembly; and methods of their use.

9 Claims, 13 Drawing Sheets

U.S. PATENT DOCUMENTS

| | | |
|---|---|---|
| 5,256,291 A | 10/1993 | Cagle |
| 5,256,292 A | 10/1993 | Cagle |
| 5,330,057 A | 7/1994 | Schiller et al. |
| 5,392,925 A * | 2/1995 | Seyffert .................... 209/405 |
| 5,417,858 A | 5/1995 | Derrick et al. |
| 5,417,859 A | 5/1995 | Bakula |
| 5,690,826 A * | 11/1997 | Cravello .................... 210/384 |
| 5,783,077 A | 7/1998 | Bakula |
| 5,814,218 A | 9/1998 | Cagle |
| 5,816,413 A | 10/1998 | Boccabella et al. |
| 5,927,511 A | 7/1999 | Riddle et al. |
| 5,944,197 A | 8/1999 | Baltzer et al. |
| 5,944,993 A | 8/1999 | Derrick et al. |
| 6,000,556 A | 12/1999 | Bakula |
| 6,053,332 A | 4/2000 | Bakula |
| 6,267,246 B1 * | 7/2001 | Russell et al. .............. 209/399 |
| 6,290,068 B1 | 9/2001 | Adams et al. |
| 2003/0038060 A1 * | 2/2003 | Freissle et al. ............. 209/405 |

* cited by examiner

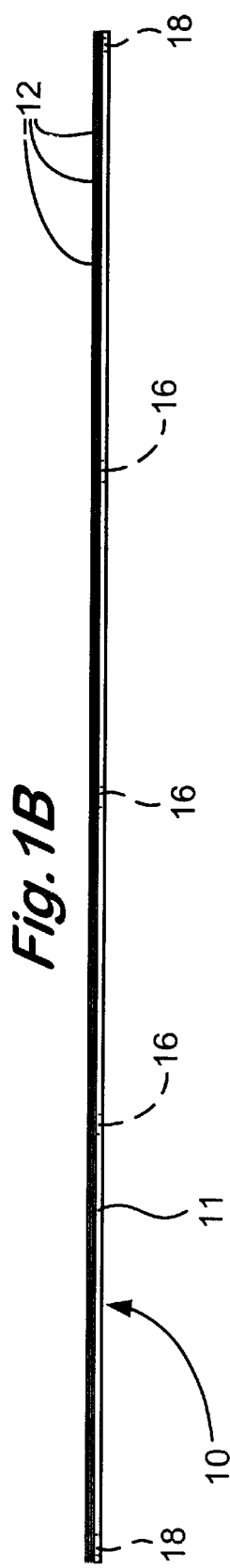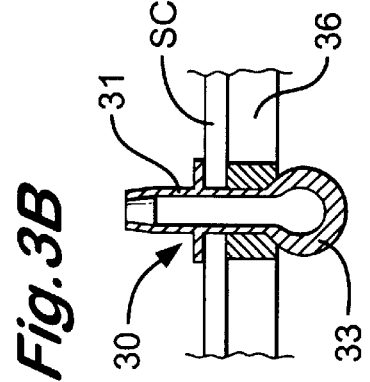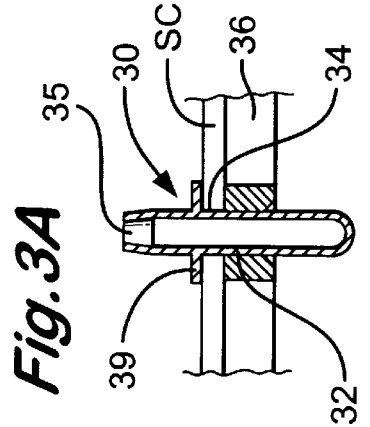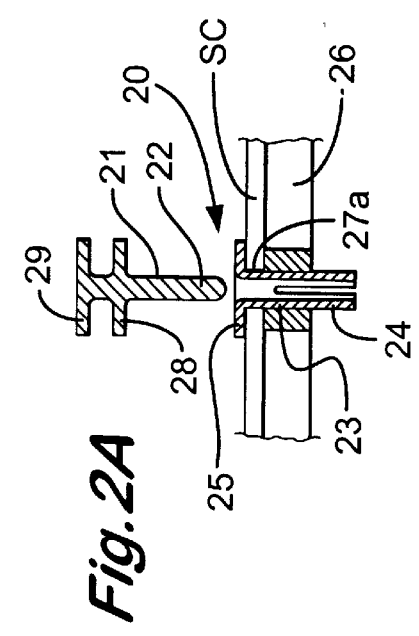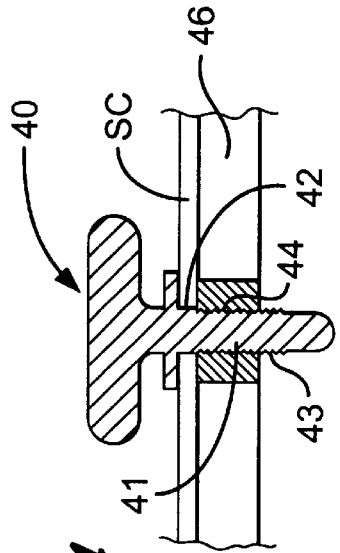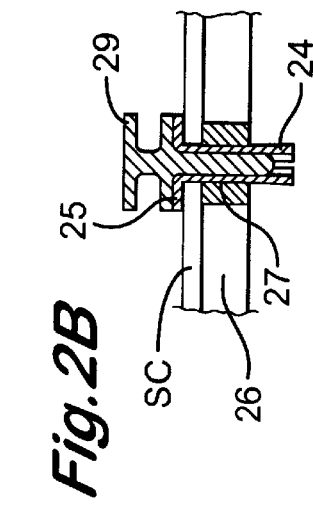

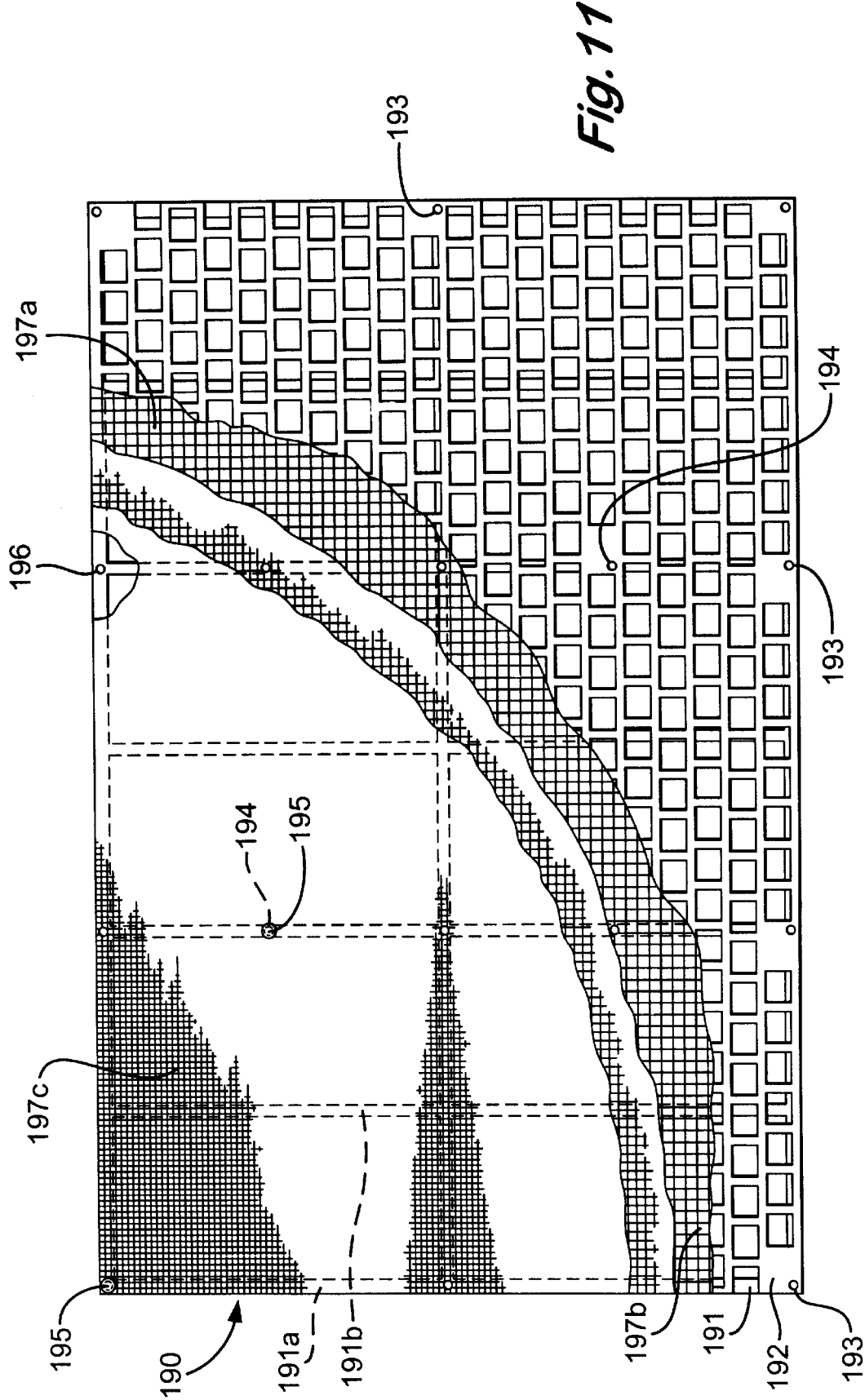

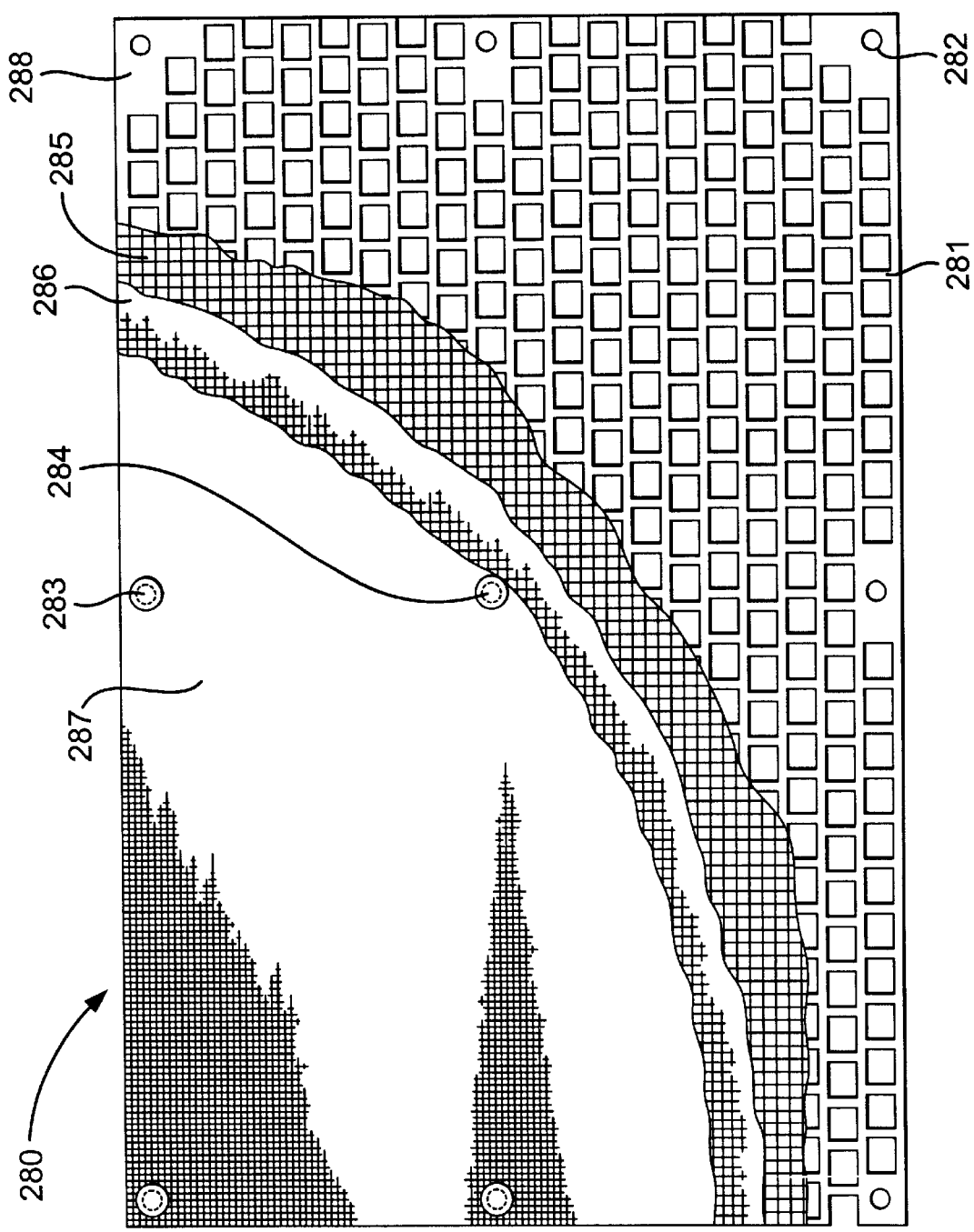

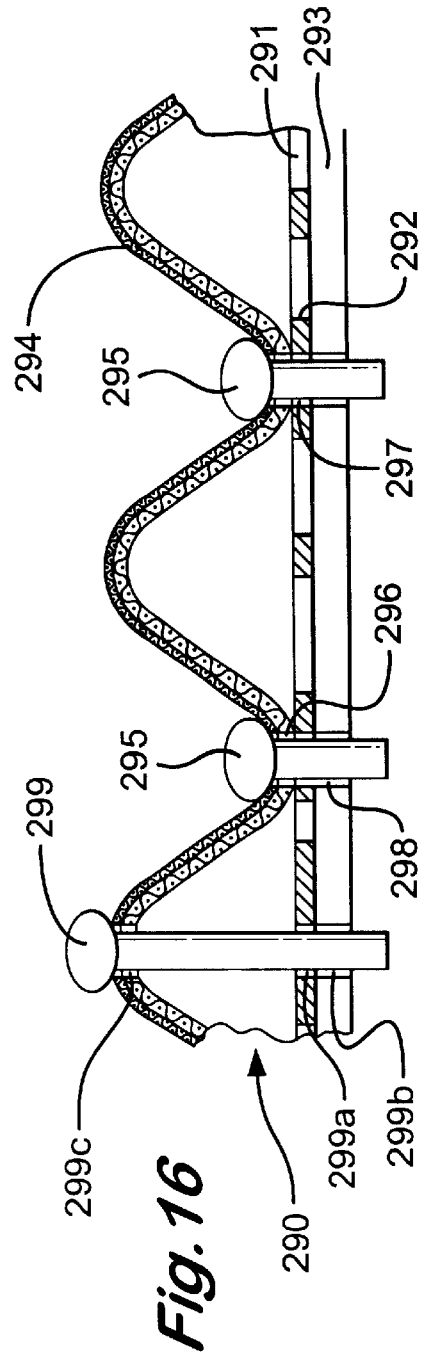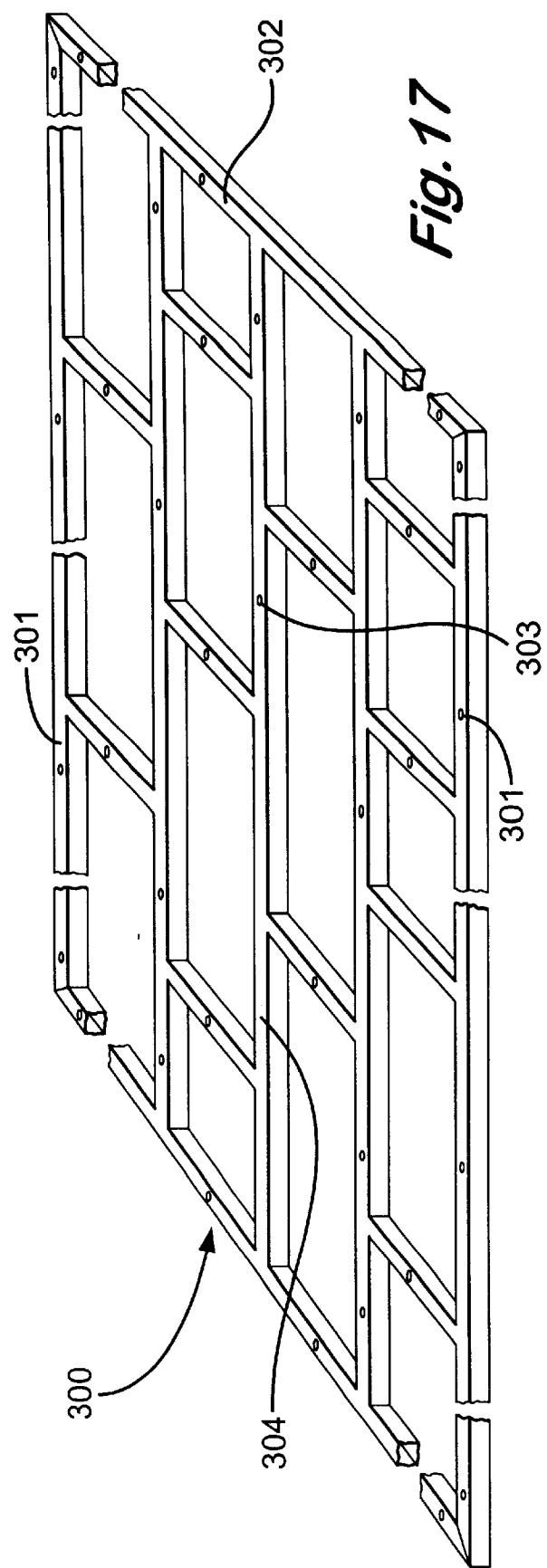

SHALE SHAKERS AND SCREENS FOR THEM

BACKGROUND OF THE INVENTION

1. Field of the Invention

The present invention is directed to screens for shale shakers, supports for such screens, shale shakers with such screens, and methods of using such supports, screens, and shakers; and in particular aspects, to a screen assembly which is releasably mounted on a shaker with a plurality of releasable fasteners which extend through the screen assembly and to a shale shaker with one or more such screen assemblies.

2. Description of Related Art

Vibratory separators are used in a wide variety of industries to separate materials such as liquids from solids or solids from solids. Typically such separators have a basket or other screen holding or mounting apparatus mounted in or over a receiving receptacle or tank and vibrating apparatus for vibrating the basket. One or more screens is mounted in the basket. Material to be treated is introduced to the screen(s) either by flowing it directly onto the screen(s) or by flowing it into a container, tank, or "possum belly" from which it then flows to the screen(s). Also in some multi-screen apparatuses material flows from an upper screen onto a lower screen.

The prior art discloses a variety of mounting systems and apparatuses for releasably mounting a screen assembly to a shale shaker. These include drawbar and hookstrip apparatuses; inflatable device systems; wedge systems; e.g. the systems described in U.S. Pat. No. 6,179,128 issued Jan. 30, 2001; U.S. Pat. No. 5,392,925 issued Feb. 28, 1995; U.S. Pat. No. 4,882,054 issued Nov. 21, 1989; U.S. Pat. No. 4,582,597 issued Apr. 15, 1986; and in the prior art referred to in each of these references.

Referring now to FIG. 5, a prior art shale shaker 1 has a screen 2 (with screen or screening cloth or mesh as desired) mounted on vibratable screen mounting apparatus or "basket" 3. The screen 2 may be any known screen or screens. The basket 3 is mounted on springs 4 (only two shown; two as shown are on the opposite side) which are supported from a frame 6. The basket 3 is vibrated by a motor 5 and interconnected vibrating apparatus 8 which is mounted on the basket 3 for vibrating the basket and the screens. Elevator apparatus 7 provides for raising and lowering of the basket end.

FIG. 6 discloses an example of a prior art shaker system (e.g. as shown in U.S. Pat. No. 5,190,645 incorporated fully herein for all purposes). The system A has a shale shaker K having a screen or screens S. The screen(s) S are mounted in a typical shaker basket B and one or more vibrators V (any known suitable shaker vibrator) vibrate the basket B and hence the screen(s) S. The other components of the system A are as described in U.S. Pat. No. 5,190,645.

There is a need, recognized by the present inventors, for an efficient and effective screen support and screen assembly for a shale shaker. There is a need, recognized by the present inventors, for an efficient and cost-effective screen support and screens with such a support that are easily installed and which are easily repairable. There has long been a need for a relatively light weight screen assembly which can be easily handled and manipulated manually by personnel. There has long been a need, recognized by the present inventors, for a screen assembly none of whose portions is blocked by parts of a support frame beneath screening material; and for such a screen assembly which is easily plugged for repair.

SUMMARY OF THE PRESENT INVENTION

The present invention discloses, in at least certain aspects, a support for a screen or screen assembly for a shale shaker, the support with screening material thereon. Such a support has a body with a plurality of holes therethrough through which are inserted fasteners for releasably holding a screen assembly with such a support to a shale shaker. Corresponding holes are made through screening material for insertion therethrough of the fasteners. Such a support may, according to the present invention, be a strip support with a series of spaced-apart strips or such a support may have a series of perforations or holes across its surface. Either certain of these holes or perforations are used as the holes through which fasteners are inserted or the plate is made so that there is relatively more area and mass around each fastener hole. A shale shaker, in one embodiment according to the present invention (e.g. with basic components as the prior art shakers described or referred to herein) is, according to the present invention, provided with one or more screens with such a support as described herein according to the present invention. Such a shaker has holes in its screen-mounting structure or deck corresponding to the fastener holes in the screen assembly (or assemblies) mounted thereon.

Screens according to certain aspects of the present invention may be made with plastic grids or fused plastic masses with holes, etc. that correspond to the fastener holes, etc. of a support according to the present invention.

The present invention, in one embodiment includes a shale shaker with a frame; a "basket" or screen mounting apparatus in the frame; one or more screen assemblies according to the present invention with supports according to the present invention mounted to the basket; the one or more screen assemblies mounted to the basket with fasteners according to the present invention; basket vibrating apparatus; and a collection tank or receptacle below the basket. In one particular aspect such a shale shaker treats drilling fluid with drilled cuttings, debris, etc. entrained therein.

It is, therefore, an object of at least certain preferred embodiments of the present invention to provide:

New, useful, unique, efficient, non-obvious screen supports for screen assemblies for shale shakers and methods for using them to separate components of material to be treated thereby.

Such screen supports, and screens therewith, with a plurality of holes for receiving releasable fasteners for releasably connecting such a screen assembly to a shale shaker; and Such screens made with a plastic with holes, etc. corresponding to the fastener holes, etc. in a screen support according to the present invention; and shale shakers with screens with such supports and fasteners, and methods of their use.

The present invention recognizes and addresses the previously-mentioned problems and long-felt needs and provides a solution to those problems and a satisfactory meeting of those needs in its various possible embodiments and equivalents thereof. To one of skill in this art who has the benefits of this inventions realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of certain embodiments of the invention may be had by references to the embodiments which are shown in the drawings which form a part of this specification.

FIG. 1B is a side view of the screen assembly of FIG. 1A.

FIGS. 2A and 3A are side views in cross-section of fasteners system for use in releasably connecting a screen assembly according to the present invention to a shale shaker. FIG. 2B shows the fastener of FIG. 2A in position connecting a screen assembly to a shale shaker. FIG. 3B shows the fastener of FIG. 3A in position following activation connecting a screen assembly to a shale shaker.

FIG. 4 is a side view in cross-section of a fastener system releasably connecting a screen assembly according to the present invention to a shale shaker.

FIGS. 11, 12 and 15 are top views of screen assemblies according to the present invention.

FIG. 16 is a crossectional view of a screen assembly according to the present invention.

FIG. 17 is a perspective view of a frame support for a screen assembly according to the present invention.

DESCRIPTION OF EMBODIMENTS PREFERRED AT THE TIME OF FILING FOR THIS PATENT

Figure 1A:
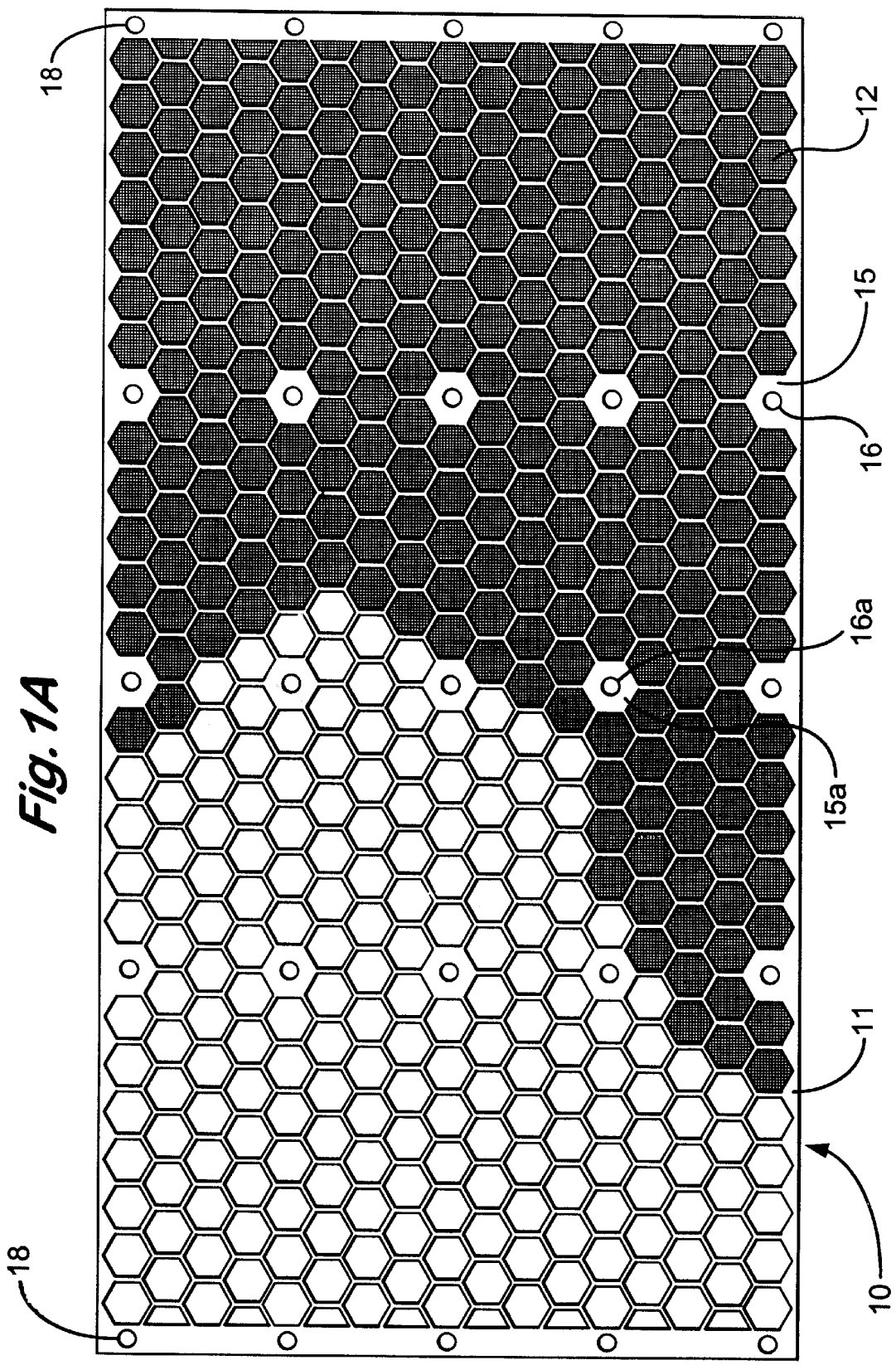
FIG. 1A is a top view of a screen assembly according to the present invention with a screen support according to the present invention.
Figure 5:
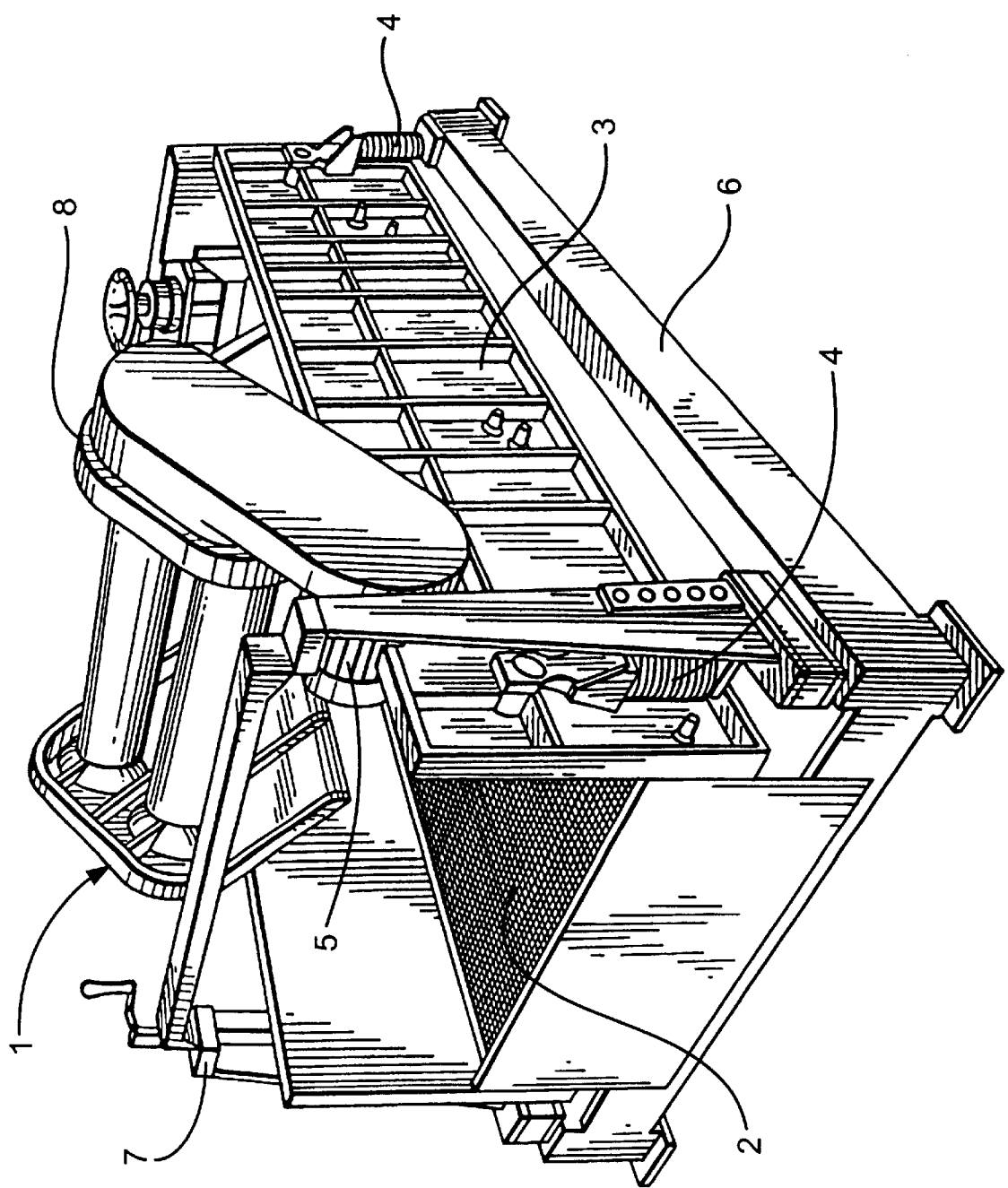
FIG. 5 is a perspective view of and FIG. 6 is a schematic view of a prior art shale shaker.
Figure 6:
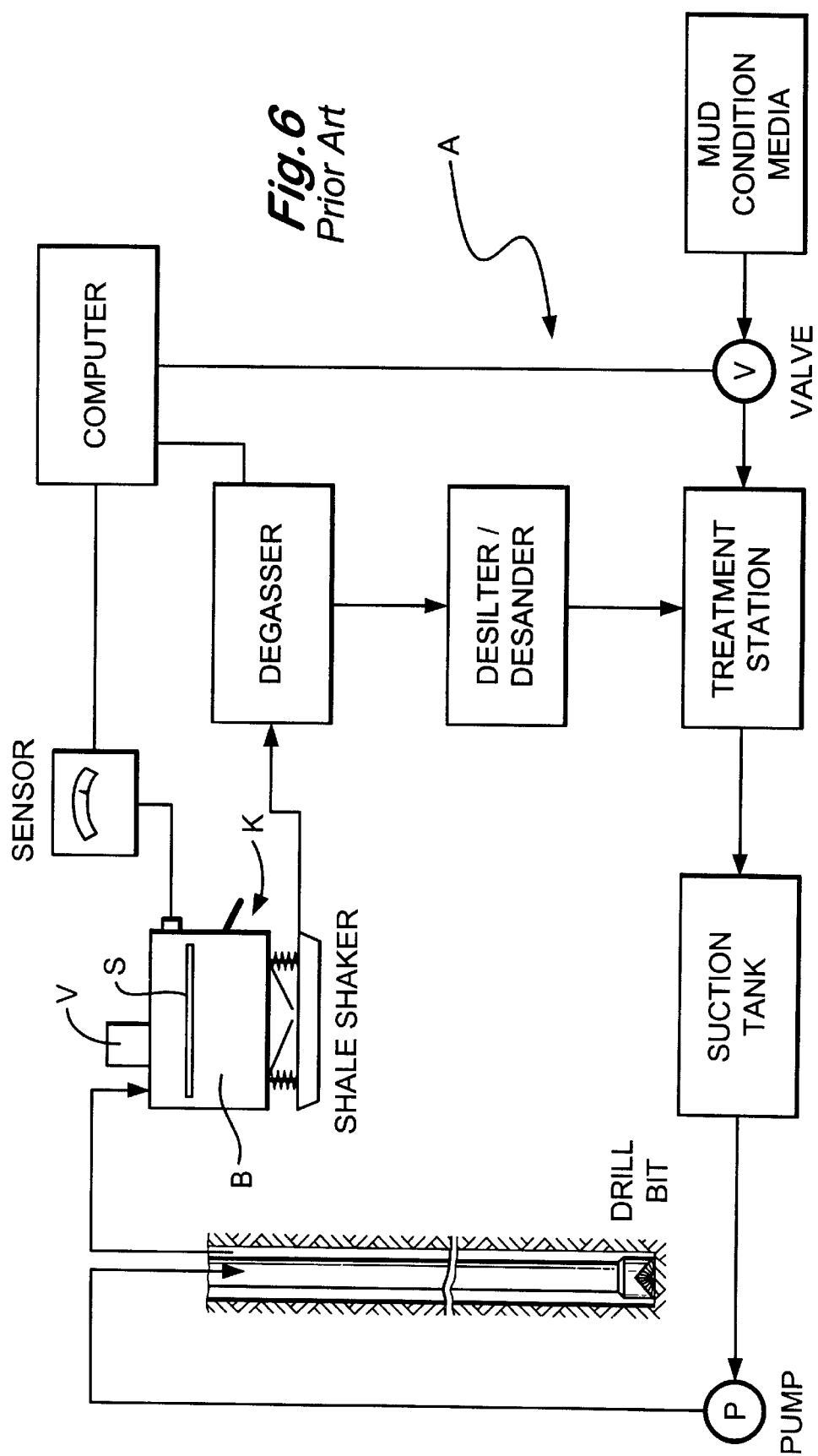

FIGS. 1A and 1B show a screen assembly 10 according to the present invention which has a perforated plate 11 on which is mounted three layers 12 of mesh or screening material. One, two, four, or more layers of screening material may be used. The plate 11 has a plurality of side holes 18 on each of two of its sides for receiving releasable fasteners for mounting the screen 10 in a suitable shale shaker. Optionally, the screen assembly's plate 11 may also have inner portions 15 with holes 16 therethrough and/or inner portions 15a with interior holes 16a therethrough which holes are also for receiving releasable fasteners for releasably connecting the screen assembly to the shale shaker. To insert the fasteners through the holes 16, 16a and 18 into holes in a deck or bed below a screen assembly, corresponding and appropriate holes or openings are made in the screening material. Although the entire inner portions 15a are revealed in FIG. 1A, in an actual screen assembly, prior to making holes in screening material, the holes 16a and inner portions 15a are covered by screening material.

FIG. 2A shows a fastener system 20 according to the present invention which has a top member 21 with a lower portion 22 that is received within a bottom member 23 which has a plurality of spaced-apart fingers 24. The lower portion 22 upon insertion into the bottom member 23 forces the fingers 24 apart for a tight friction fit of the lower portion 22 within the bottom member 23. An upper shoulder 25 of the bottom member 23 abuts the top surface of a screen assembly SC which may be any screen assembly according to the present invention. A shale shaker deck 26 has a hole 27 corresponding to a hole 27a through the screen assembly SC through which is mounted the bottom member 23. Any fastener hole in any screen assembly or part thereof according to the present invention and/or any corresponding hole through a shaker deck according to the present invention may have any desired opening shape as viewed from above, including, but not limited to, rectangular, triangular, elliptical, oval, pentagonal, circular, and hexagonal.

FIG. 2B shows the fastener system 20 releasbly holding the screen assembly SC to the shaker deck 26. Spaced apart shoulders 28 and 29 of the top member 21 provide an abutment against the screen assembly SC (the bottom shoulder 28) and a structure (the top shoulder 29) to grasp or contact to facilitate removal of the fastener.

FIGS. 3A and 3B show another embodiment of a fastener system according to the present invention for releasably connecting a screen assembly to a shale shaker. A system 30 has a fastener 31 with a body 32 and a lower inflatable member 33. A stop shoulder 39 on the body 32 abuts the top of a screen assembly SC (like that of FIG. 2A). Following insertion of the body 32 through a hole 34 in the screen assembly SC (see FIG. 3A), the inflatable member 33 is inflated through valve apparatus 35 to hold the fastener (and thus the screen assembly) in place. To release the fastener, the valve apparatus is activated to allow air to escape from the inflated inflatable member 33. The inflatable member 33 is sized and positioned so that, upon inflation, it abuts an underside of the deck 36 (like the deck 26, FIG. 2A) of a shale shaker.

FIG. 4 shows a fastener 40 for releasably connecting a screen assembly SC (like that of FIG. 2A) to a shale shaker with a deck 46 (like the deck 26, FIG. 2A). The fastener 40 has a body 41 that is inserted through a hole 42 in the screen assembly SC. Optional threads 43 on the fastener body 41 mate with corresponding threads 44 on the deck 46 to releasbly hold the fastener, and thus the screen assembly, in place. Any fastener according to the present invention and any deck according to the present invention may have such threads. Optionally, the threads are deleted and the fastener is held in place with a friction fit; and/or, glue, epoxy, or an adhesive is used to hold the fastener in position (as may be done, optionally, with any other fastener disclosed herein); or a non-threaded locking fastener is used with required holes and/or surfaces on the shaker deck or bed. Any suitable screw or bolt may be used for the body 41. Optionally, the fastener 40 has a top head 45 that facilitates turning of and removal of the fastener 40. Any fastener in FIGS. 2A–4 may be used with any screen assembly disclosed herein.

It is within the scope of this invention for the screen assembly SC to have one, two, three or more layers of screening material, i.e., screen, mesh, and/or cloth made, e.g., of stainless steel wire and/or plastic. Any such layer or combination of layers may be bonded together (glued, welded, and/or sintered) in any known manner and/or bonded to the plate 11 in any known manner. Any such layer or layers of screening material may be substantially flat or may be undulating (with a series of alternating ridges and valleys) as is well known in the art. According to the present invention any known support, plate, strip support, or frame for supporting a shale shaker screen and/or for mounting thereto of one or more layers of screening material, mesh, and/or cloth may have one or more holes for receiving one or more fasteners according to the present invention for releasably connecting a screen assembly to a shale shaker.

Figure 7:
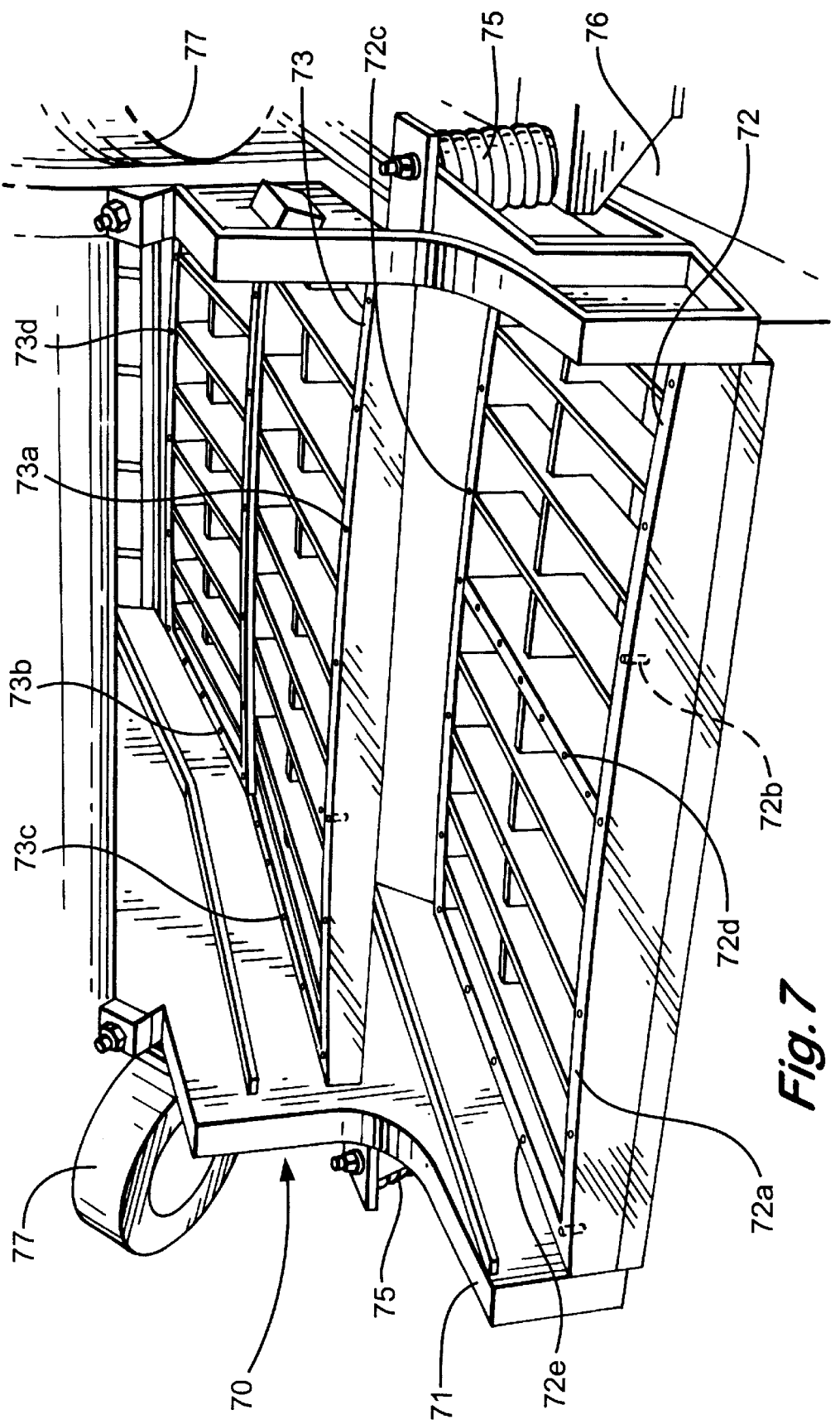
FIGS. 7–9 are perspective views of shale shakers according to the present invention.

FIG. 7 shows a shale shaker 70 according to the present invention which is like a shaker disclosed in U.S. Pat. No. 5,641,070 co-owned with the present invention and incorporated fully herein for all purposes; but the shaker 70 has a basket 71 with screen mounting decks 72 and 73. Supports 72a and 73a of the decks 72 and 73, respectively, have holes 72b, 72c, 72d and 72e therethrough (in deck 72) and 73a, 73b, 73c (in deck 73). As desired such holes may be provided on all sides and/or on all cross-members of either or both decks. These holes are sized and positioned to correspond to holes in a screen support (and, optionally, holes through screening mesh and/or cloth) of screen assemblies (not shown) to be mounted in the basket 71. Springs 75 (two shown; four, six or more may be used) support the basket in a shaker body 76 and one or more vibrators 77 connected to the basket 71 vibrate the basket 71. Holes as in either or both decks 72, 73 may be provided for the deck(s) of any known multi-deck shale shaker so that screen assemblies according to the present invention with holes according to the present invention may be releasably fastened thereto.

Figure 8:
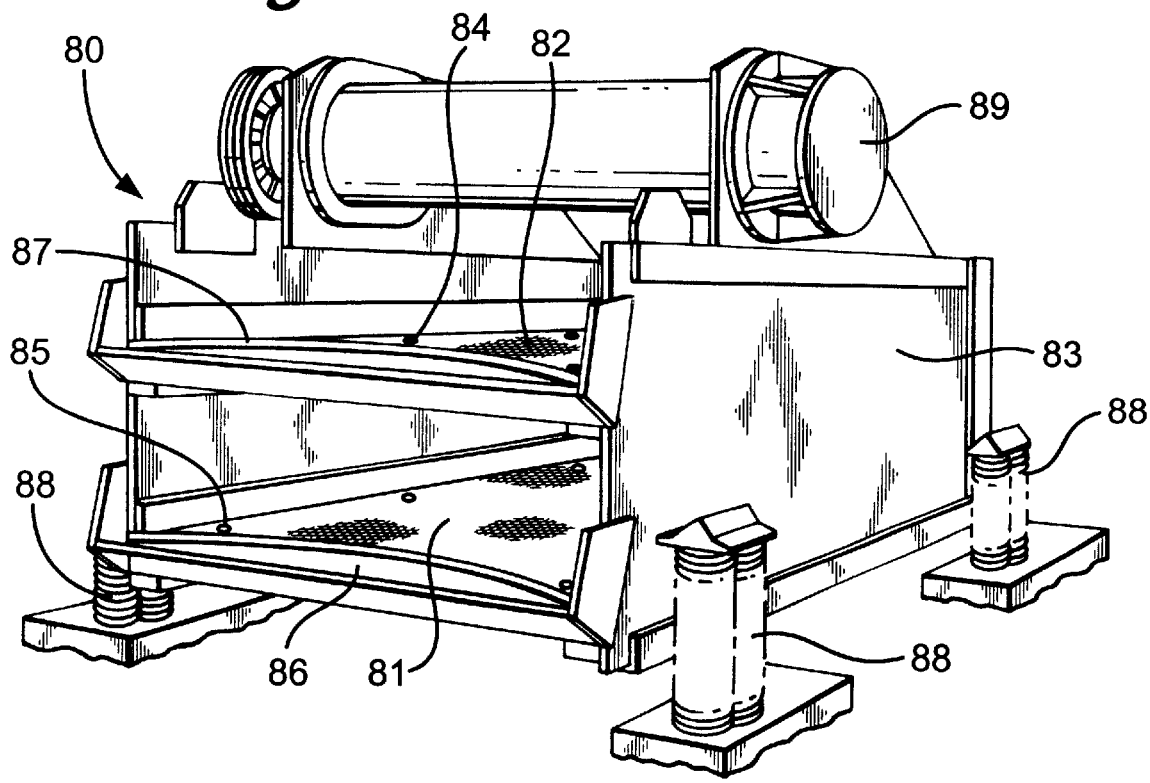

FIG. 8 shows a shale shaker 80 according to the present invention with screen assemblies 81, 82 according to the present invention mounted in a basket 83 to decks 86, 87 with fasteners 84, 85 which may be any screen assembly disclosed herein according to the present invention. The fasteners 84, 85 extend through holes (not shown) in the screen assemblies into holes (not shown) in the decks 86, 87. The basket 83 is mounted on spring mounts 88 (three shown; four used in this embodiment) and is vibrated by a vibrator 89.

Figure 9:
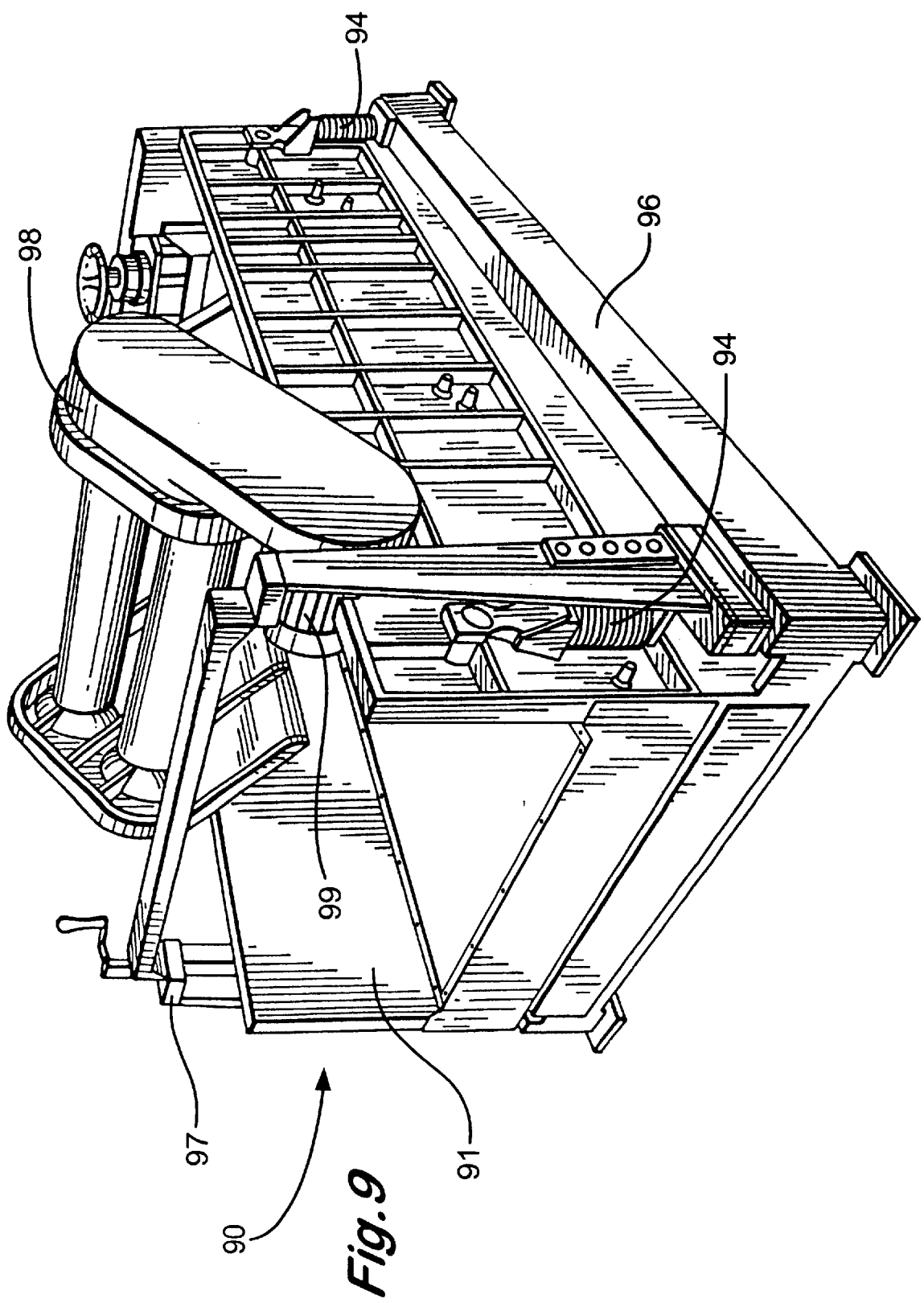

Referring now to FIG. 9, a shale shaker 90 according to the present invention has a screen deck 92 according to the present invention in a basket 91. The deck 92 has holes 93 therearound into which are releasably inserted fasteners (not shown; including, but not limited to, fasteners as disclosed herein and/or fasteners according to the present invention) to releasably secure one or more screen assemblies (not shown) to the deck 92. Any screen according to the present invention may be used on the deck 92. The basket 91 is mounted on springs 94 (only two shown; two as shown are on the opposite side) which are supported from a frame 96. The basket 91 is vibrated by a motor 99 and interconnected vibrating apparatus 98 which is mounted on the basket 91 for vibrating the basket and the screens. Optional elevator apparatus 97 provides for raising and lowering of the basket end.

Figure 10B:
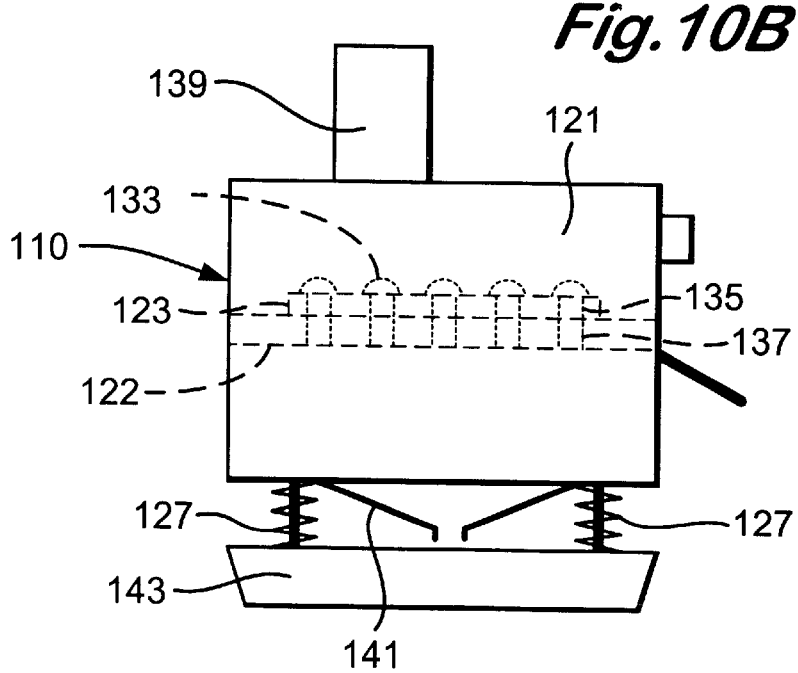
FIG. 10B shows a shale shaker of the system of FIG. 10A.
Figure 10A:
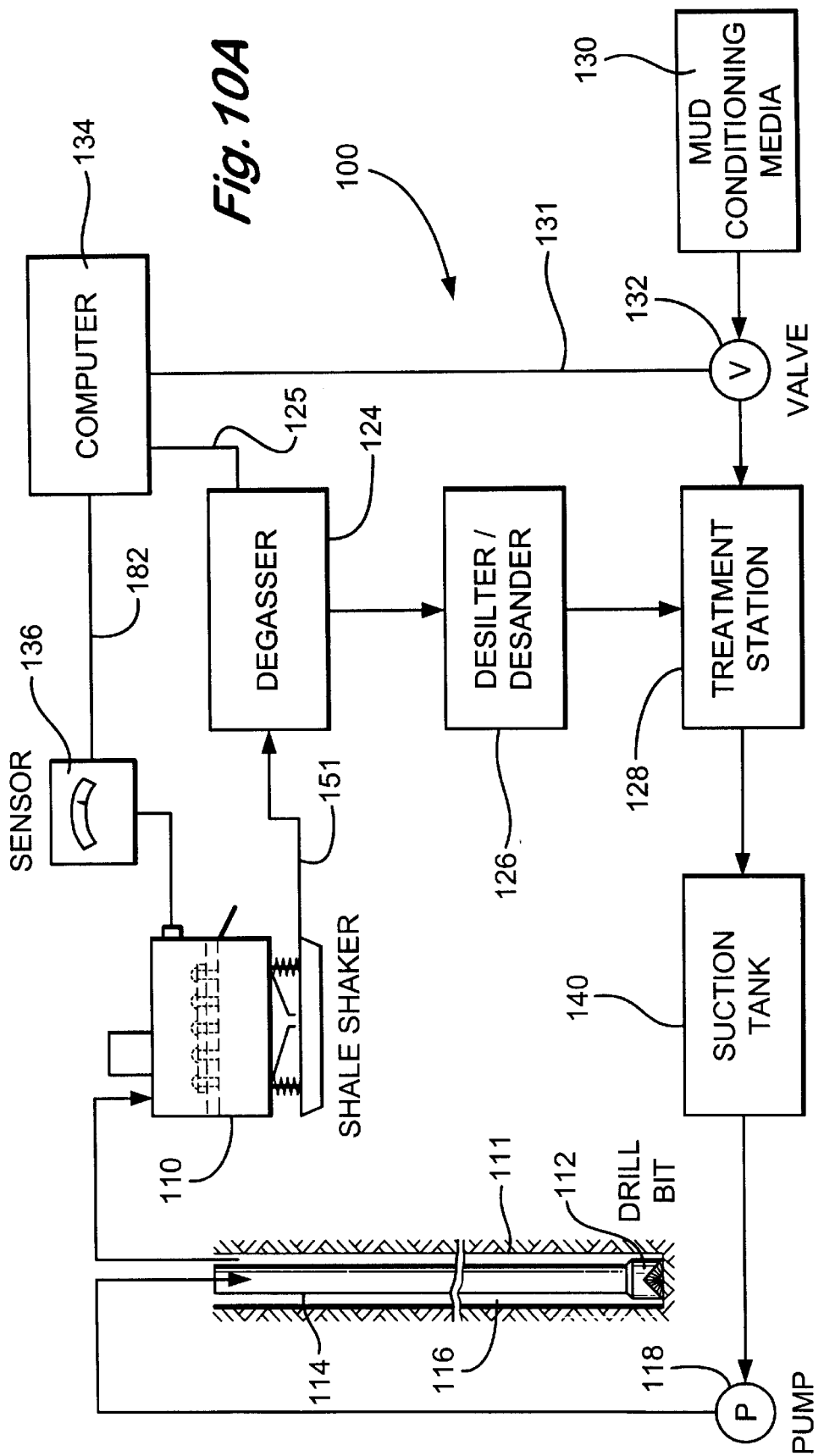
FIG. 10A is a schematic view of a system according to the present invention.

Referring now to FIGS. 10A and 10B a well 111 is being drilled by a bit 112 carried on a string of drill pip 114. Drilling mud is pumped by a pump 118 into the drill pipe 114 and out through nozzles in the bit 112. The mud cools and cleans the cutters of the bit and then passes up through a well annulus 116 flushing cuttings out with it.

After the mud is removed from the well annulus 116, it is treated before being pumped back into the pipe 114. First, the mud enters the shale shaker 110 where relatively large cuttings are removed. The mud then enters a degasser 124 where gas can be removed if necessary. Degasser 124 may be automatically turned on and off, as needed, in response to an electric or other suitable signal produced by a computer 124 and communicated to degasser 124 as indicated by line 125. The computer 1344 produces the signal as a function of data from a sensor assembly 136 associated with shale shaker 110 and described more fully below. The data from sensor assembly 136 is communicated to computer 134 by line 182. The mud then passes to a desander and (or a desilter), jointly represented by station 126, for removal of smaller solids picked up in the well.

The mud next passes to a treating station 128 where, if necessary, conditioning media, such as barite, may be added from source 130. As shown, suitable flow control means, indicated in a simplified form by valve 132, controls flow of media from source 130 to station 128. Valve 132, in turn, may be automatically operated by an electric or other suitable signal produced by computer 134 as a function of the data from sensor assembly 136, such signal being communicated to valve 132 as indicated by line 131.

From the station 128, the mud is directed to tank 140, from which pump 118 takes suction, to be re-cycled through the well. Any shale shaker disclosed herein may be substituted for the shale shaker 110. The system 100 is like the systems disclosed in U.S. Pat. No. 5,190,645 (incorporated fully herein for all purposes), but the system 100 has a shake shaker according to the present invention.

The shale shaker 110 as shown in detail in FIG. 10B has a basket 121 in which a screen mounting deck 122 (shown schematically in FIG. 10B). A screen assembly 123 according to the present invention (shown schematically) is releasably secured to the deck 122 by a plurality of spaced-apart fasteners 133 which extend through holes 135 in the screen assembly 123 and through corresponding holes 137 in the deck 122. Vibrator apparatus 139 vibrates the basket 121 which is mounted on mounts 127. Material flows through exit structure 141 into a collection receptacle 143.

The screen assembly 123 may be any (one, two, three or more) screen assembly according to the present invention and the fasteners 133 may be any fastener according to the present invention.

FIG. 11 shows a screen assembly 190 according to the present invention which has a lower tubular frame support 191 to which is connected and/or welded a perforated plate 192 (including, but not limited to a perforated plate like that disclosed in U.S. Pat. No. 4,575,421, incorporated fully herein for all purposes; but with holes according to the present invention for receiving fasteners according to the present invention to releasably connect the screen assembly 190 to a shale shaker).

The perforated plate 191 of the screen assembly 190 has a plurality of peripheral holes 193 and a plurality of interior holes 194 (either holes 193 or holes 194 may be deleted—as is the case for any support, plate, or frame according to the present invention). A plurality of fasteners 195 (two shown; one through each hole 193, 194) connect the plate 192 to the tubular frame support 191. The fasteners' lower ends are received in holes 196 of the tubular frame support 191 whose position corresponds to that of the holes 193, 194.

As shown in FIG. 11 there are three layers 197a, 197b, 197c of screening material on the plate 192. Any one or two of these layers may be deleted; any known combination of layers may be used; and the layers may or may not be connected and/or bonded together at their edges and/or across their surfaces in any known manner with any known material and/or process. Any known suitable tubular members may be used to make the tubular frame support 191 with its outer members 191a and its cross-members 191b.

Figure 12:
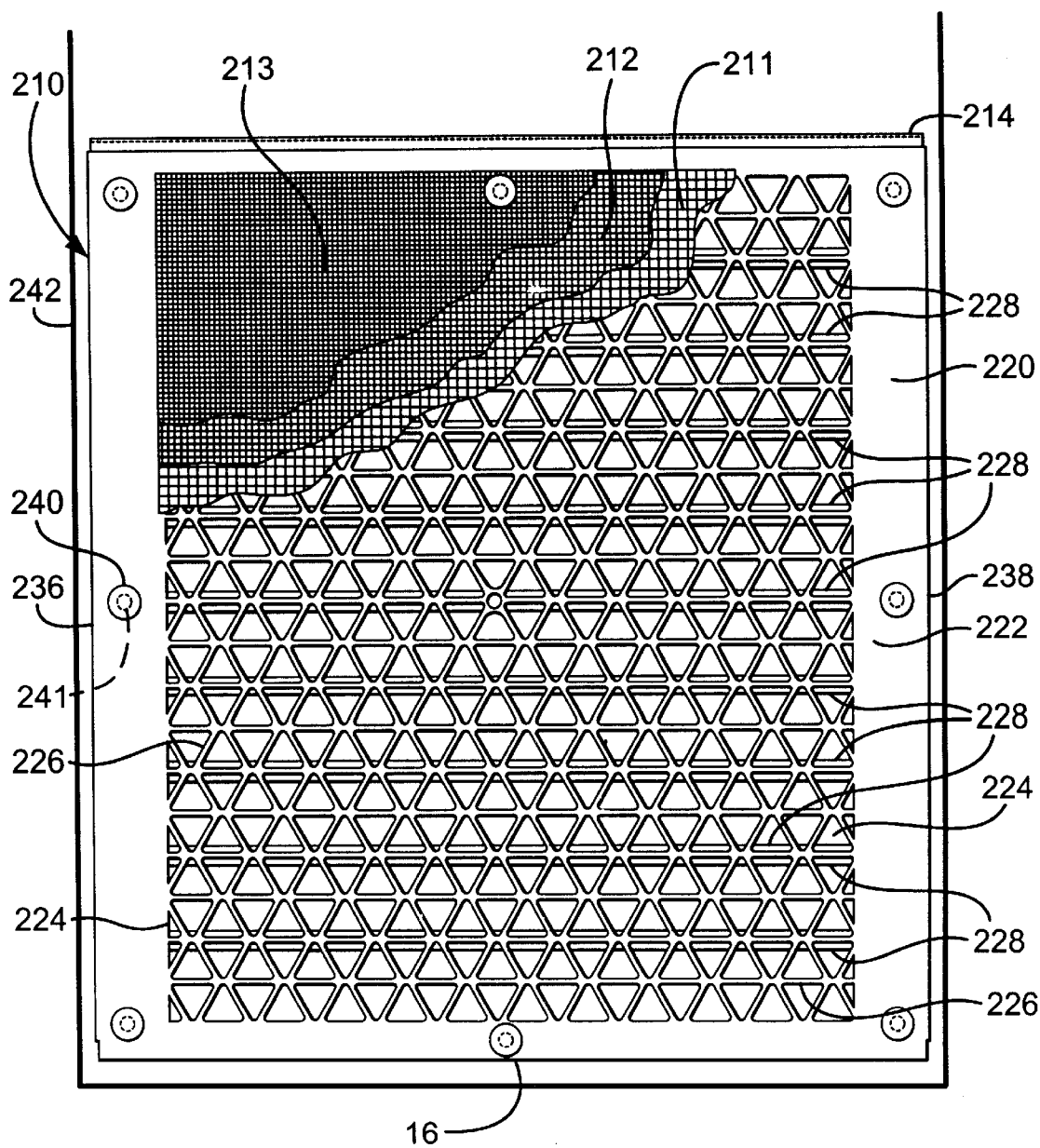

FIG. 12 shows a screen assembly 210 according to the present invention with a unibody structure 220 according to the present invention. The screen assembly 210 has, optionally, three 211, 212, 213 of screening material (shown partially; extending over the entire open area of the unibody structure 220) bonded to a top surface 222 of the unibody structure 220. Preferably, the layers 211, 212, 213 are also bonded together over substantially their entire surface area. A plurality of fasteners 240 extend through holes 241 in the unibody structure 220 to releasably connect the screen assembly 210 to a screen mounting deck 242 of a shale shaker (not shown in its entirety). Optionally, one or more fasteners 243 (one shown) may extend through the layers of screening material on the screen assembly 210 and into the deck 242.

A plurality of openings 224 through the unibody structure 220 define a plurality of support members 226. To the underside of the unibody structure 220 are, optionally, connected a plurality of spaced-apart ribs 228 which, in one aspect are welded to a metal unibody structure 220. In this particular embodiment the ribs 228 are positioned along a substantial majority of their length directly beneath one of the support members 226 that extend across a major portion of the unibody structure 220; but it is within the scope of this invention to use no such ribs or to position them anywhere on the underside of the unibody structure 220. The unibody structure 220 has spaced-apart sides 236, 238. The screen assembly 210 has an end 214 and a ledge end 216. The ledge end has an upper ledge portion that rests on a shoulder of an end of an adjacent screen. Thus one screen end seals against another screen end when such screens are used end-to-end (as described in U.S. Pat. No. 6,283,302 co-owned with the present invention as incorporated fully here for all purposes).

Figure 13:
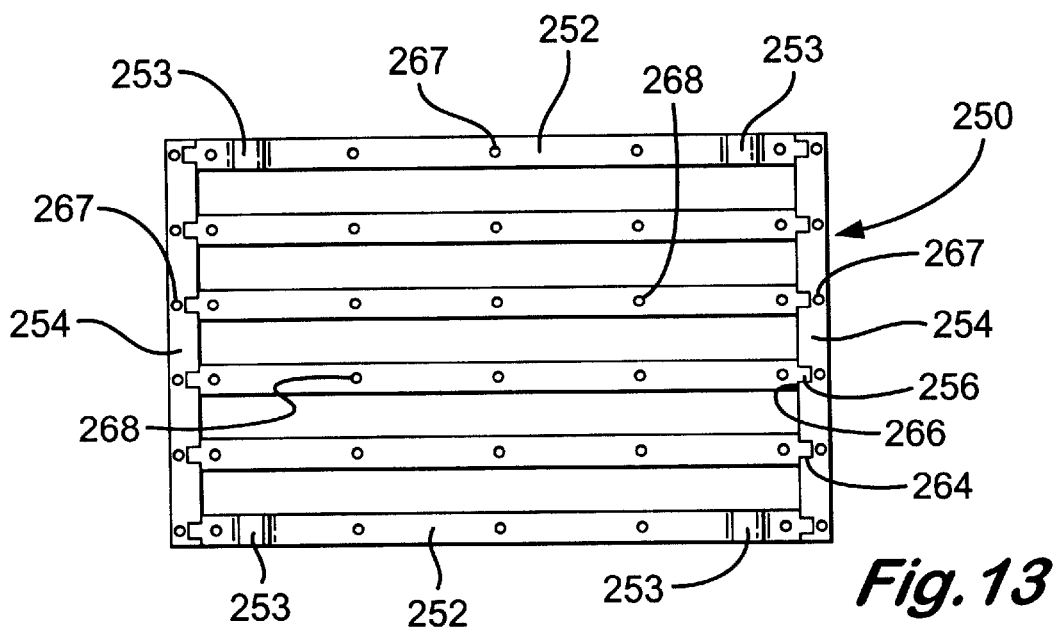
FIG. 13 is a top view of screen assembly according to the present invention.

FIG. 13 shows a screen strip support 250, according to the present invention with a plurality of spaced-apart strips 252 (made of any suitable metal or metal-like material) secured to and between spaced-apart sides 254. The screen strip support 250 is like the strip support of FIG. 51A, U.S. Pat. No. 6,290,068 (co-owned wit the present invention and incorporated fully herein for all purposes); but the screen strip support 250 has outer holes 267 and inner holes 268 through which may be inserted any fastener disclosed herein for releasably connecting the support 250 (and any screen assembly of which it is a part) to a shale shaker deck. Either holes 267 or holes 268 may be deleted. Any known strip support may be provided, according to the present invention, with holes 267 and/or holes 268. Each end 256 of each strip 252 is received and held in a recess 264 in a side 254. The recess 264 corresponds in shape to the shape of the end 256 and a shoulder 266 of each strip 252 abuts a side 254. The end 256 may be inserted into the recess 254 from the side or from above or below. The top and bottom strips 252 each has two humps or ridges 253 which are located, sized, and configured to be received in corresponding corrugations of a corrugated plate and/or corrugated screen assembly. It is within the scope of this invention for each strip to have one, two, or a plurality of multiple humps or ridges. In one aspect there is one hump or ridge for each corrugation on a superimposed plate and/or screen assembly. It is within the scope of this invention to delete the humps and/or ridges so that the strips 252 are flat for use with flat mesh and/or screen(s).

Figure 14A:
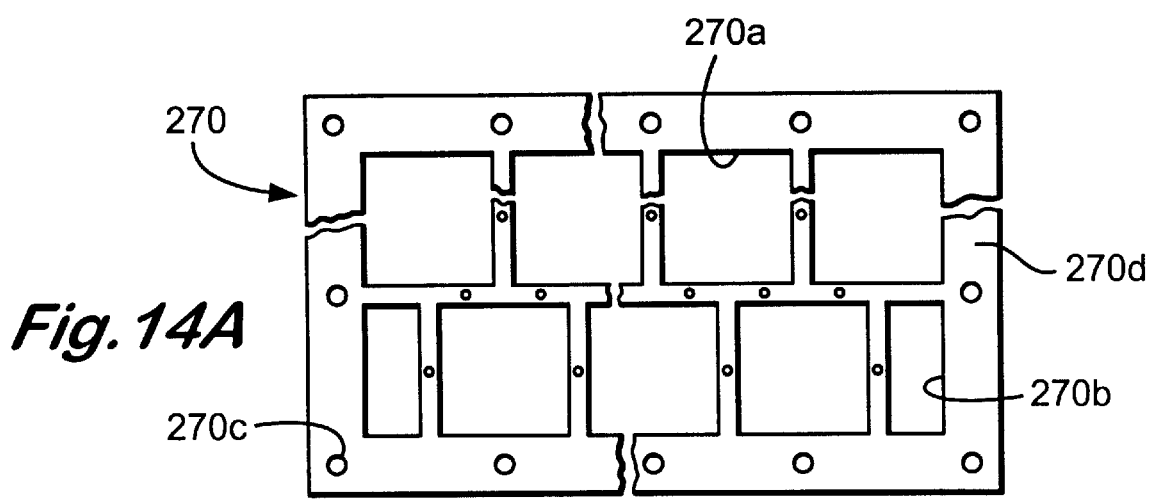
FIG. 14A is a top view of a plastic grid according to the present invention.
Figure 14B:
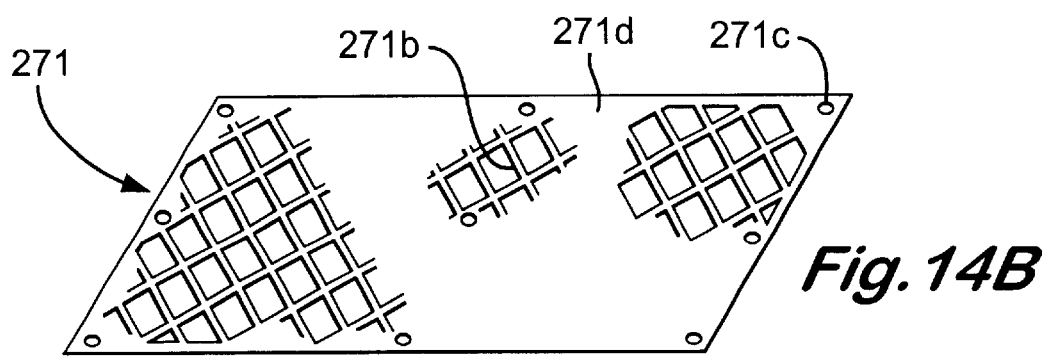
FIG. 14B is a perspective view of a plastic grid according to the present invention.

FIGS. 14A and 14B show plastic grids 270, 271, respectively, each with a body 270*d*, 271*d* respectively with a plurality of openings 270*a*, 270*b*, 271*b* respectively, therethrough. Although only certain of the openings 271*b* are shown, it is to be understood they extend across the entire surface of the body 271*d*. The plastic grids 270, 271 are like plastic grids disclosed in U.S. Pat. Nos. 5,417,859; 5,958,236; 5,783,077; and 6,053,332 (all these patents incorporated fully herein for all purposes); but the grids 270, 271 each have a plurality of spaced-apart holes 270*c*, 271*c*, respectively therethrough for accommodating fasteners according to the present invention which extend through a screen assembly according to the present invention to releasably connect a screen assembly to a shale shaker. Any grid disclosed in the patents cited above and any known plastic grid or piece used in a screen assembly for a shale shaker may have holes as shown in FIGS. 14A and 14B (and/or any holes disclosed herein for any perforated plate or support disclosed herein); and any screen or screen assembly disclosed in the patents cited above may have any such grid or piece. Any such grid or piece according to the present invention may have holes corresponding to any fastener holes as described herein. In one aspect the holes in the grid or piece are made, according to the present invention, prior to the final formation or assembly of a screen or screen assembly (as may also be the case with any perforated plate or strip support according to the present invention); while in another aspect the holes are made through the plastic grid (and/or through other parts, pieces and/or layers of the screen or screen assembly) following final formation or assembly thereof (as may also be the case with any perforated plate, frame or strip support according to the present invention). It is to be understood that it is within the scope of the present invention to have a plastic layer or a mass of fusing plastic fusing together layers of screening material, the layer or mass optionally provided initially by a plastic grid, the plastic layer or mass having holes for fasteners corresponding to holes in a screening material support.

FIG. 15 shows a screen assembly 280 according to the present invention with a lower supporting perforated plate 281 according to the present invention. The screen assembly 280 is like those disclosed, e.g., in U.S. Pat. No. 4,575,421 (incorporated fully herein for all purposes; but without hookstrip mounting apparatus and with a plurality of peripheral holes 282 and one or more interior holes 284 for receiving fasteners 283 to releasably connect the screen assembly 280 to a shale shaker (not shown) whose deck or mounting structure has corresponding holes for releasably receiving a portion of the fasteners 283 (as is the case for a shale shaker and fasteners through any screen or screen assembly according to the present invention). In certain preferred aspects holes 282 and/or 284 are simply added to a perforated plate as shown in U.S. Pat. No. 4,575,421; while in other aspects the plate is initially made so that plate portions 288 have only a hole 282 or a hole 284. In one particular aspect (as is true for any perforated plate according to the present invention) an area like the areas 288 (and/or like the areas 15, FIG. 1A and/or like the areas around the holes 193, 194, FIG. 11 and for any plastic grid or piece according to the present invention) are at least as large (viewed from above) as one of the openings or perforations through the plate and in another preferred aspect are at least twice as large (viewed from above) as such an opening or perforation.

One, two, or three (or more) layers of mesh and/or screening material may, according to the present invention, be used on a perforated plate 280 (or on any perforated plate according to the present invention); e.g., as shown in FIG. 15, three layers 285, 286, and 287 are used on the plate 281. Although these layers are shown partially, it is to be understood they substantially cover the plate 281.

The prior art discloses a variety of non-flat screens and screen assemblies sometimes referred to as "3D" or "Three Dimensional" screens (e.g., but not limited to, as disclosed in U.S. Pat. Nos. 5,417,793; 5,417,858; 5,417,859; 6,053,332; 5,598,236; 5,783,077; 6,283,302; 6,290,068—all incorporated fully herein for all purposes). FIG. 16 illustrates that, according to the present invention, non-flat screen assemblies may be fastened with releasable fasteners passing through holes therethrough to a shale shaker. A screen assembly 290 (shown partially) has a lower perforated plate 291 (which, optionally, may be any support plate, frame, or strip support) with a plurality of spaced-apart openings 292 therethrough (see, e.g., but not limited to, FIG. 13, U.S. Pat. No. 5,417,858; and FIG. 3, U.S. Pat. No. 5,417,859 regarding possible plates and screening material). A plurality of fasteners 295 passing through holes 296 (in screening material 294), holes 297 (in the plate 291) and into (and, optionally, through) holes 298 (in a shaker deck 293).

As shown in FIG. 16, it is also within the scope of this invention to employ one or more fasteners 299 which extend through a portion of the screening material 294 that is not directly adjacent the plate 291 but which is spaced-apart therefrom. As shown a fastener 299 passes through a highest (with respect to the plate 291 as viewed in FIG. 16) portion of the screening material 294 and through holes 299a, and 299b, in the plate 291 and deck 293, respectively, and through a hole 299c in the material 2924; but it is within the scope of this invention to have one or more fasteners 299 (or 295) pass through any part or portion of the screening material 294. As may be the case with any fastener according to the present invention and any fastener used with a screen assembly according to the present invention, any suitable desired washer(s) and/or sleeve(s) may be used with the fastener(s) 295, 299 at any interface and/or for any hole.

It is within the scope of the present invention to provide holes for fasteners as disclosed herein in any known prior art frame used as a support for screening material for a screen assembly for a shale shaker. FIG. 17 illustrates a frame 300 according to the present invention which is like a frame as disclosed in U.S. Pat. No. 5,417,858, FIG. 8; but which has a series of outer holes 301 through tubular frame members 302 and, optionally, (or instead of the holes 301) holes 303 through interior tubular members 304. Any holes described herein for releasably fastening a screen assembly to a shale shaker may be used in the frame 300 or in any frame support for a shale shaker screen assembly. Any layer or layers of mesh or screening material described or referred to herein or known in the prior art may be used on the frame 300 or on any frame according to the present invention.

With screen assemblies according to the present invention (e.g. as in FIG. 1A) which employ no lower support frame, any opening through the lower support can receive a common plug to replace torn screening material above the opening and no frame member blocks any of the openings which could require a customized plug.

The present invention, therefore, provides in certain, but not necessarily all embodiments, a screen support for supporting screening material of a screen assembly for use on a shale shaker for separating components of material introduced thereto, the screen support having a body, a plurality of spaced apart holes through the body, each of said holes for receiving part of a fastener used for releasably connecting the screen assembly to a shale shaker (e.g., to a deck, basket, mount, or bed of the shaker). Such a screen support may include one or some of the following, in any possible combination: wherein the body is a perforated plate; wherein the body has a series of spaced-apart support strips; wherein the body is a unibody structure; wherein the body is a tubular frame with four sides and a plurality of crossmembers between the four sides; wherein the body has two spaced-apart ends and the plurality of spaced-apart holes extend through the two spaced-apart ends; wherein the body has an interior area between the sides and ends and the holes of the plurality of holes extend through the interior area of the body; wherein the body has two spaced-apart ends and some holes of the plurality of spaced-apart holes extend through the two spaced-apart ends and the body has an interior area and some holes of the plurality of holes extend through the interior area of the body; wherein the body has a plurality of spaced-apart fluid flow openings therethrough and each hole of the plurality of holes is equidistant from a plurality of the spaced-apart fluid flow openings; and/or wherein each opening of the plurality of spaced-apart fluid flow openings has an area as viewed from above and each hole extends through a solid body part with an area as viewed from above substantially equal to the area as viewed from above of one of the openings of the plurality of spaced-apart fluid flow openings.

The present invention, therefore, provides in certain, but not necessarily all embodiments, a screen assembly for a shale shaker for separating components of material introduced thereto, the screen assembly with a screen support for supporting screening material of a screen assembly for use on a shale shaker for separating components of material introduced thereto, the screen support having a body, a plurality of spaced apart holes through the body, each of said holes for receiving part of a fastener used for releasably connecting the screen assembly to a shale shaker, and screening material on the screen support. Such a screen assembly may include one or some of the following, in any possible combination: wherein the screening material comprises a plurality of layers of screen mesh; a plastic grid or mass of plastic with holes therethrough corresponding in position to at least a portion of the holes of the plurality of spaced-apart holes of the body of the screen support so that fasteners are passable through the holes of the plastic grid or mass; wherein the screen support is from the group consisting of perforated plate, frame, strip support and unibody structure; wherein the screening material is substantially flat on the screen support; wherein the screening material has undulating undulations with ridges and valleys above the screen support; and/or wherein there are holes through the ridges and/or valleys of the screening material through which a portion of a fastener is insertable.

The present invention, therefore, provides in certain, but not necessarily all embodiments, a shale shaker, the shale shaker having a basket, the shale shaker for separating components of material introduced thereto, the shale shaker including a collection receptacle beneath the basket, a deck on the basket for mounting a screen assembly thereon, and a screen assembly having a support, screening material on the support, the support having a plurality of openings therethrough suitable for the flow of fluid therethrough, the fluid from the material introduced into the basket, the support comprising a body, a plurality of spaced apart holes through the body, each of said holes for receiving part of a fastener used for releasably connecting the screen assembly to the deck of the basket, the deck of the basket having a plurality of spaced-apart holes corresponding to the plurality of spaced-apart holes through the body of the screen support, and fasteners releasably connecting the screen assembly to the deck, each fastener with a portion passing through a hole in the support of the screen assembly and a portion in the deck. In such a shale shaker the fasteners may be from the group consisting of threaded fasteners, screens, bolts, locking fasteners, finger expansion fasteners, air injection fasteners, and friction-fit fasteners and/or the fasteners may be adhesively secured in place The present invention, therefore, provides in certain, but not necessarily all embodiments, a method for separating components of a material with a shale shaker according to the present invention (any disclosed herein), with a screen assembly according to the present invention the method including introducing the material into the basket and onto the screen assembly, and separating a component of the material with the screen assembly.

In conclusion, therefore, it is seen that the present invention and the embodiments disclosed herein and those covered by the appended claims are well adapted to carry out the objectives and obtain the ends set forth. Certain changes can be made in the subject matter described, shown and claimed without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form its principles may be utilized.

What is claimed is:

1. A shale shaker, for separating components of material introduced thereto, the shale shaker comprising
   a basket,
   a collection receptacle beneath the basket,
   a deck on the basket for mounting a screen assembly thereon, and
   the screen assembly comprising
      a support,
      screening material on the support,
      the support having a plurality of openings therethrough suitable for the flow of fluid therethrough, the fluid from the material introduced into the basket,
      the support including a body with a plurality of spaced apart support holes therethrough, each hole of the plurality of spaced apart support holes for receiving part of a fastener used for releasably connecting the screen assembly to the deck of the basket,
   the deck of the basket having a plurality of spaced-apart deck holes corresponding to the plurality of spaced-apart support holes through the body of the support, and
   fasteners connecting the screen assembly to the deck, each fastener passing through the screening material, through a support, and into a deck hole.

2. The shale shaker of claim 1 wherein the fasteners are from the group consisting of threaded fasteners, screens, bolts, locking fasteners, finger expansion fasteners, air injection fasteners, and friction-fit fasteners.

3. The shale shaker of claim 1 wherein the fasteners are adhesively secured in place.

4. The shale shaker of claim 1 wherein the screening material comprises a plurality of layers of screen mesh.

5. The shale shaker of claim 1 wherein the support is from the group consisting of perforated plate, frame, strip support and unibody structure.

6. The shale shaker of claim 1 wherein the screening material is substantially flat on the screen support.

7. The shale shaker of claim 1 wherein the screening material has undulating undulations with ridges and valleys above the screen support.

8. The screen assembly of claim 7 wherein there are screen holes through the ridges of the screening material through which a portion of a fastener is insertable.

9. The shale shaker of claim 1 wherein the support comprises a tubular frame with four sides and a plurality of crossmembers between the four sides.

* * * * *